Aug. 31, 1965  W. R. LONG  3,203,562
BULK RACK TOBACCO HARVESTER
Filed July 26, 1962  3 Sheets-Sheet 1

INVENTOR
W. R. LONG

BY *A. Yates Dowell*
ATTORNEY

Aug. 31, 1965

W. R. LONG 3,203,562

BULK RACK TOBACCO HARVESTER

Filed July 26, 1962

INVENTOR
W. R. LONG

BY
ATTORNEY

Aug. 31, 1965 W. R. LONG 3,203,562
BULK RACK TOBACCO HARVESTER
Filed July 26, 1962 3 Sheets-Sheet 3
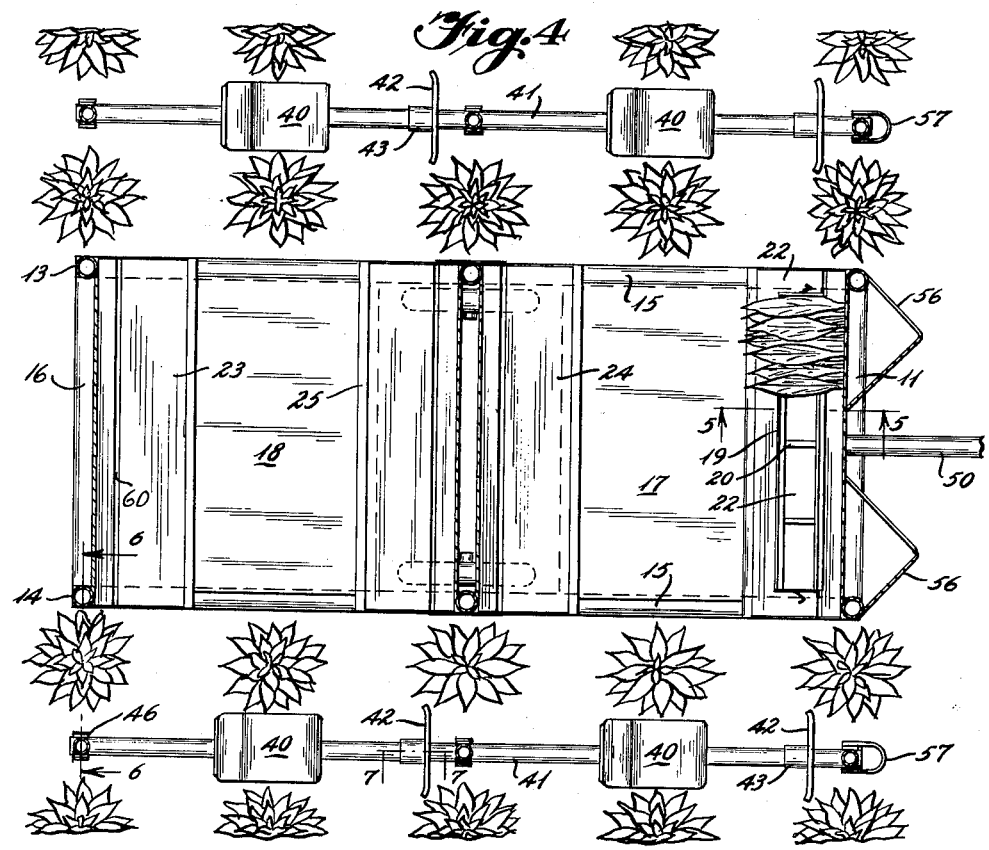
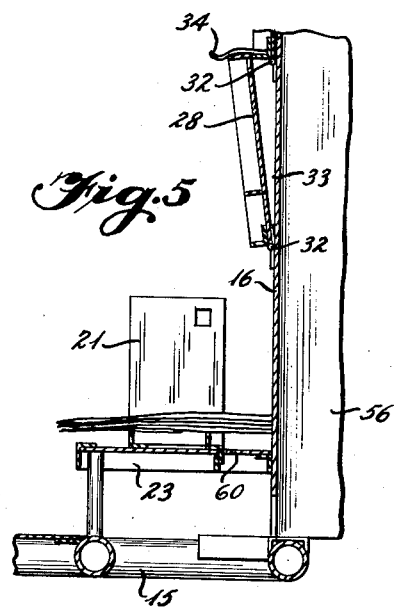
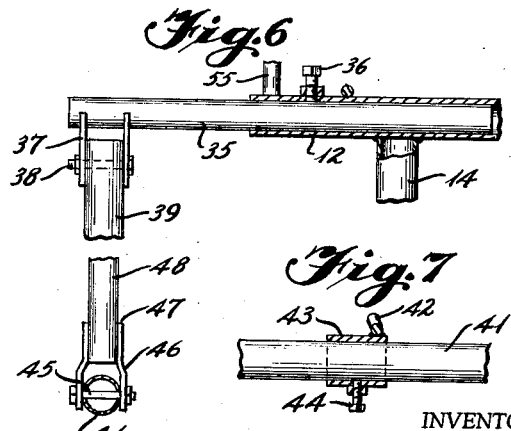
INVENTOR
W. R. LONG
BY
ATTORNEY

United States Patent Office 3,203,562
Patented Aug. 31, 1965

3,203,562
BULK RACK TOBACCO HARVESTER
William R. Long, Tarboro, N.C., assignor to Long Manufacturing Company, Tarboro, N.C.
Filed July 26, 1962, Ser. No. 212,668
8 Claims. (Cl. 214—5.5)

This invention relates to the harvesting, handling, and transporting of tobacco or other crops, and to apparatus and equipment utilized for implementing and accomplishing the several operations to which the product is subjected with minimum skilled labor as well as a minimum of effort and expense.

The invention relates particularly to a tobacco harvester having seats on which workmen ride to gather the ripe leaves of tobacco and allowing them to accumulate until it is desired to transfer them to a barn for curing and further treatment.

Various kinds of tobacco harvesters have been produced, some of which carried workmen and were self-propelled. These machines have not been fully satisfactory because their cost was beyond the reach of many farmers, they were too large to be readily turned at the end of rows of tobacco, they required too much labor and were too expensive to operate and required excessive handling and at times allowed the tobacco to be damaged.

It is an object of the invention to overcome the difficulties enumerated and to provide a tobacco harvester of simple low cost compact construction, easily maneuverable, requiring minimum effort and labor as well as minimum handling of tobacco in the harvesting process.

Another object of the invention is to provide a simple inexpensive and compact tobacco harvester in the form of a trailer capable of being produced from materials readily available in almost every community, and in which the seats for workmen are adjustably carried for compactness when not in use but for convenient adjustability in use as well as the supporting means for the seats being pivotally suspended to swing upon the harvester encountering a hole or gully in the terrain.

Other objects and advantages of the invention will be apparent from the following description taken in conjunction with the accompanying drawings wherein:

FIG. 1 is a perspective of a bulk rack tobacco harvester illustrating one application of the invention;

FIG. 4 is a horizontal section on the line 4—4 of FIG. 3;

FIG. 5 is a longitudinal vertical section on the line 5—5 of FIG. 4;

FIG. 6 is a transverse vertical section on the line 6—6 of FIG. 4; and

FIG. 7 is a detail on the line 7—7 of FIG. 4.

Briefly stated, the harvester of the present invention comprises a trailer having a drawbar, pair of ground engaging wheels on which is supported a generally rectangular frame with three upright transverse walls one at each end and an intermediate wall, with lower fixed shelves extending rearwardly and forwardly from the front and rear walls and in opposite directions from the intermediate wall, and with a couple of additional shelves over each of the fixed shelves on which racks or holders of tobacco are adapted to be located while being filled, the overlying shelves each being foldable from a horizontal rack supporting position to an upright position to permit a rack to be placed on a lower shelf and filled, a platform for a workman being disposed between the front and intermediate walls, and a second platform for a workman between the intermediate and rear walls, means also being provided for workmen who gather the tobacco along and at each side of the main frame, such seats being carried on a bar substantially parallel and near to the ground at each side of the vehicle, such bar being supported by swingable arms pivotally carried on transverse bars which telescope into the upper transverse members of the frame so that when the wheels of the trailer roll into a hole or gully and the support for the workmen engages the earth, it will not cause excessive strain upon the frame, and on account of the way in which the supports for workmen are mounted, the harvester may be of minimum width at all times when not in use and when in use can be of maximum width due to the lateral adjustment of the portion carrying the workmen's seats.

Figure 2:
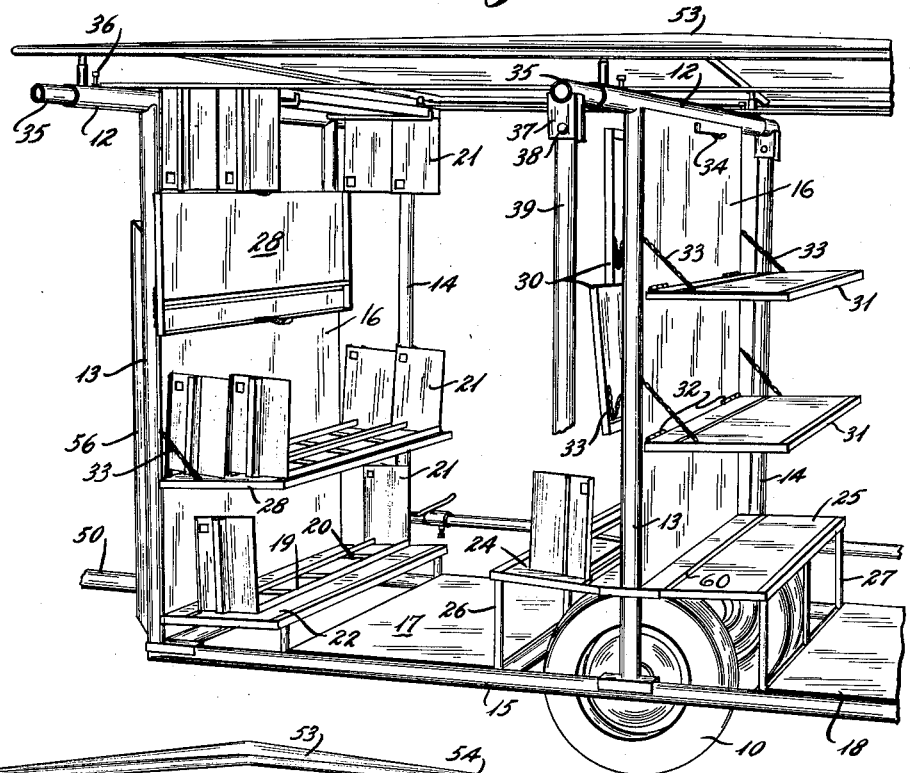
FIG. 2 is an enlarged fragmentary perspective of the rear portion of the harvester.
Figure 3:
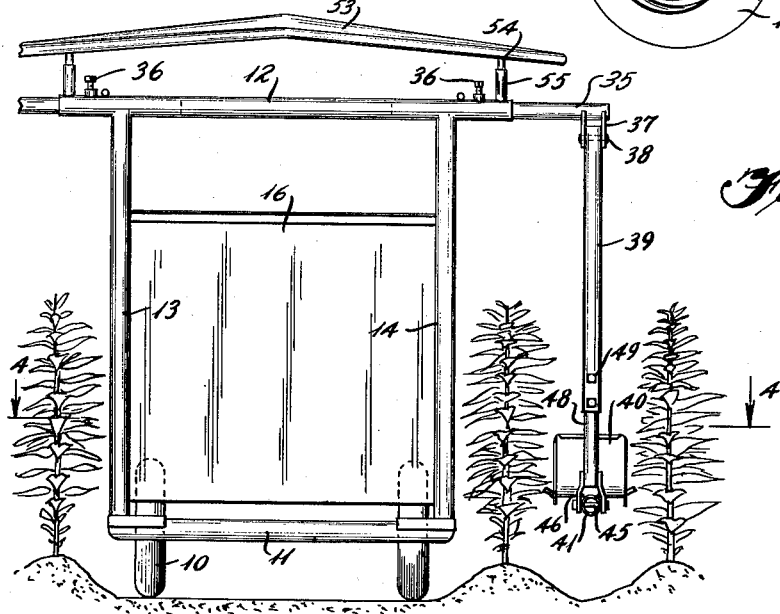
FIG. 3 is a rear elevation.

With continued reference to the drawings, the bulk rack tobacco harvester of the present invention is a relatively simple, compact and lightweight trailer mounted on a pair of transversely spaced wheels 10 located generally midway of its length to provide appropriate weight balance thereon. The body of the trailer harvester comprises a generally rectangular rigid frame structure preferably constructed of relatively lightweight tubular members of which members 11 and 12 comprise, respectively, the substantially parallel and normally horizontal transverse bottom and top members of the trailer frame while the tubular members 13 and 14 comprise the substantially vertical and parallel respective side members of the frame. The tubular side frame members 13 and 14 are fixedly secured in any suitable manner at their bottom ends to tubular longitudinally extending outer side members 15 of the frame bottom portion and at their upper ends to the transversely extending top members 12 at locations laterally outward of the wheels 10, as clearly shown in FIGURES 1–4. The bottom frame members 11 and 15 preferably are normally positioned in a substantially horizontal plane approximately at the level of the axles of wheels 10. Noting FIGS. 1, 2 and 4, each of the vertical side frame tubular members 13 and 14 are located abreast of each other at each end of the trailer frame and at the mid-point intermediate its length in alignment with the ground engaging wheels 10. Extending transversely between and secured to the side frame members 13 and 14 are vertical wall partitions or panels 16, the center panel over the wheels 10 being at a higher elevation relative to the end panels to provide appropriate clearance for the wheels 10. The purpose of the panels 16 will be later explained.

Between the intermediate and front and rear transverse walls 16 are located floor sections or panels 17 and 18 for the support of workmen who receive and place tobacco on holders, composed of lower horizontal bars 19 connected by cross bars 20 and having end retainer members 21.

In order to support and position the racks or holders for convenient receipt of leaves of tobacco a fixed low level shelf or platform 22 having a rack positioning slot 60 is provided next to the upright wall 16 at the front of the machine and a corresponding low level platform 23 is provided next to the upright wall at the rear end of the machine and in contact with opposite sides of the intermediate wall are provided front and rear platforms 24 and 25 and at slightly higher elevations than the platforms 22 and 23 to accommodate the wheels 10, such platforms 24 and 25 being provided with additional supports 26 and 27.

Located at substantially equal and predetermined vertical spacings the platforms 22, 23, 24 and 25 are pivoted foldable tobacco holding shelf members 28 at the front, 29 at the rear, and forward and rear shelf members 30 and 31 attached at the intermediate position. Each shelf member is pivotally mounted on hinges 32 secured on the respective walls 16 and is prevented from lowering below horizontal position by means of a chain 33 at each end of the same, the shelf being movable from a collapsed upright position out of use to a lowered generally horizontal position where it serves the dual function of supporting a holder thereupon, but also as a tobacco confining member above a lower tobacco holding member. Each of the second and third shelves which are pivoted is adapted to be held in an upright collapsed or out of the way position by means of a spring latch 34. Not only do the transversely extending walls 16 provide support for the fixed and pivotally mounted shelves or platforms 22–25 and 28–31 on which the tobacco holding racks 19–21 are placed or supported, they also provide, in conjunction with the shelf rack positioning slots 60, stacking alignment means and endwise support for the stacked tobacco leaves, as is clearly apparent in FIGS. 1, 4 and 5.

The harvester of the present invention is adapted to be drawn along a path provided by omitting every fifth row of tobacco and of a relatively small compact size for easy maneuverability, being approximately 12 feet in length and 5 feet wide and providing a structure capable of being readily utilized in a field of growing tobacco and turned around so that it may travel in a reverse direction upon reaching the end of rows of tobacco.

Each of the top horizontal transverse tubular members 12 telescopically receives therein and at each end thereof at each side of the trailer frame structure a tubular extension or member 35 which is lengthwise adjustable therein and securable in fixed adjusted position laterally of the trailer structure by means of one or more set screws 36 or the like. Fixedly secured adjacent the outer end of each tubular extension are a pair of spaced depending plates 37 between which a rigid tubular depending member 39 is supported for pivotal movement by means of a pivot 38 for movement substantially solely in an upright plane spaced from and parallel to the side frame members 13 and 14. Each of the depending tubular members 39 has a telescopically received extension 48 in its lower end, such extension being adjustably secured relative thereto by means of set screws 49. Secured to the lower end of each of the vertically depending extensions 48, as by welding 47 or the like, are a pair of spaced strap members or bifurcations 46 for pivoted connection at 45 to a substantially horizontally disposed tubular member 41, approximately at the level of the lower side members 15 of the frame, each of which has rigidly secured thereon, at a position normally aligned with each one of the floor platforms 17 and 18, a seat member 40. Foot rests 42 secured to sleeves 43 for the comfort and convenience of the occupants of seats 40, are positionably adjustable along the member 41 by means of set screws 44. It is believed readily apparent, noting particularly FIGS. 1, 3, 4 and 6, that the seats 40 are readily adjustably positionable outwardly from the trailer frame on either side thereof as well as vertically adjustably positionable on either side thereof. Such adjustment makes it possible to more readily accommodate the proximity of the workmen to tobacco plants of different heights during harvesting while at the same time the seats may be adjusted laterally relative to the trailer frame to conform to the spacing of the rows of the growing tobacco, or close to the frame for compactness and maneuverability at other times. Noting FIGS. 1 and 4 for example, it will be apparent that the location of the ground engaging wheels 10 within the confines of the trailer frame, together with the rigidity of the seat supporting members 35, 39, 41, prevent lateral swinging movement of the seats toward the trailer frame thereby preventing the seats 40 and their occupants from damage or injury under impact against the trailer frame structure or the wheels 10 supporting it. Accordingly, such occupants are able to more effectively perform their work by reason of the stability and safety afforded by this arrangement.

The trailer may have a drawbar 50 for its attachment to a tractor 51. If desired, a removable top 52 may be mounted on a frame 53, such top having depending pins 54 which readily fit into upright sleeves 55 welded or otherwise fixed to the tubular top frame members 12. Thus the top or roof may be readily applied and removed.

In order to prevent damage to the tobacco plants, the trailer is provided with a pair of upwardly extending angular guides or baffles 56 constructed of sheet material and mounted on the front of the trailer in a position to urge the plants to the side of the trailer. Likewise the forward pivotal connection between the depending tubular extensions 48 and the horizontal seat supporting tubular members 41 is provided with a guard 57.

It will be apparent from the foregoing that a relatively simple compact low cost bulk rack tobacco harvester is provided of relatively small size and easy maneuverability with seats for workmen laterally and vertically adjustable for maximum safety and convenience of proximity of the tobacco to the primers during the harvesting of the tobacco, but permitting the seats for workmen to be moved relatively close to the side of the vehicle at other times without danger of swinging laterally against the side frame structure thereof. Also in the harvesting the workmen who gather the tobacco from the stalks hand it directly to workman who piles the tobacco on the holders until the holders are filled one after the other beginning with the lowermost holders on the fixed shelves, whereupon the pivoted shelves are pulled down to retain the tobacco in place until all twelve holders are filled which usually requires one transverse of the rows, and upon reaching the end of the rows the tops or retainers having the prongs which extend downwardly through the tobacco to retain it in definite compact relation can be applied, such containers being described in the aforesaid application.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tobacco harvester comprising ground-engaging wheels, a generally rectangular frame mounted on said wheels in enclosing relation thereto and including side upright portions defining upright transverse walls at the front, rear and intermediate portions of the frame, said frame including a lower substantially horizontally extending base portion, a platform for tobacco handling workmen mounted on the lower base portion of the frame between each of the front and intermediate and the rear and intermediate walls, a fixed shelf extending between the side edges of said frame rearwardly from and near the bottom of the front wall, forwardly from near the bottom of the rear wall, and forwardly and rearwardly from the intermediate wall for receiving a rack or holder of tobacco having a horizontal portion on which tobacco can be placed and end portions for retaining the tobacco therebetween, a pivotally mounted overlying confining and supporting shelf for tobacco above each of said fixed shelves and located in parallel spaced relation with regard to the fixed shelf in a manner to be disposed in pivoted elevated non-tobacco confining position to allow the depositing of tobacco in a holder on the lower shelf to a height sufficient to be engaged by the next upper shelf when the latter is in horizontal tobacco supporting and retaining position, and with the weight of the tobacco on the overlying higher shelf serving to compress the tobacco on the underlying lower shelf, suspension means mounting seats for workmen one in front of the other at each side of the vehicle closely adjacent each of said platforms, said suspension means including elongate rigid generally parallel uprights pivoted solely for movement in planes parallel to said frame side upright portions, transversely elongate rigid support members transversely adjustable on said frame from which said uprights pivotally depend, whereby the seats for the workmen may be disposed in selectively spaced relation to the frame during the use of the harvester and close to the frame at other times.

2. A tobacco harvester having ground-engaging wheels, a generally rectangular frame having a normally level base portion with upright side members mounted on and encompassing said wheels, said frame including upright transverse wall portions at the front, rear and intermediate locations on said frame, a fixed low level shelf extending rearwardly from the front wall, forwardly from the rear wall and forwardly and rearwardly from the intermediate wall particularly adapted for supporting holders on which tobacco can be placed, additional shelves pivotally mounted on said wall portions above said fixed shelves and adapted to be secured in a substantially upright relation to afford access beneath them and to be lowered to a generally horizontal position to provide an upper supporting surface and to retain tobacco in an underlying holder, said first and second mentioned shelves having locating means for the holders operative in conjunction with said wall portions to effect stacking alignment and endwise support for tobacco in the holders, floor means on said frame for workmen adjacent said low level shelves, and pivoted non-flexible suspension means carrying a plurality of spaced seats for workmen outwardly of each side of said frame and movable solely in planes parallel to said upright side members and adjustable laterally of said frame.

3. The structure of claim 2 in which said pivoted suspension means each comprises a plurality of depending rigid telescoped members of selectively adjustable length spaced lengthwise of said frame, a rigid member extending longitudinally of said frame and pivotally connected at its ends to the lower ends of said depending telescoped members normally positioned at approximately the level of said frame base portion, said seats being secured on said longitudinally extending member in spaced relation to each other and adjacent a lateral end of said floor means.

4. A tobacco harvester having at least a pair of ground-engaging wheels spaced transversely thereof, a low level frame the base portion of which is positioned outwardly of and at a level below the top of said wheels, said frame being mounted on said wheels and including lower side members with spaced upright transverse wall portions extending therebetween, shelves supportingly hinged along said transverse wall portions and movable from positions substantially parallel to the wall portions to tobacco-supporting positions substantially at right angles thereto, certain of said shelves being in proximity to others to serve to engage and hold underlying shelf-supported tobacco in place, said first and second mentioned shelves having means operative in conjunction with said transverse wall portions to effect stacking alignment and endwise support for tobacco in the holders, a floor in said base portions adjacent said shelves for workmen adjacent said base portion and near the ground, said seats being suspended from the upper portion of said frame, means pivotally supporting said seats laterally outward of said frame for pivotal movement solely in planes parallel to an upright plane passing through said lower side members and movable for lateral adjustment relative to the frame, and means to secure said pivotal support means in laterally adjusted position.

5. A tobacco harvester having ground-engaging wheels, a low level frame having a base portion mounted on and enclosing said wheels, said base portion being located at a level located substantially coincident with the axis of said wheels and including spaced upright transverse wall portions, shelves in vertically spaced relation for supporting stacked tobacco thereon and hinged to each of said transverse wall portions, said shelves being movable from a position substantially at right angles thereto, certain of said shelves being in proximity to others to serve to engage and hold underlying tobacco in place, platform means on said frame base portion intermediate said transverse wall portion adapted to support at least one workman thereon for placing tobacco on said shelves, and seat means pivotally supported solely for planar pivotal movement solely parallel to and adjacent to and outwardly of said frame base portion to support other workmen for the purpose of harvesting the tobacco.

6. A tobacco harvester comprising a generally rectangular frame structure supported by wheels spaced transversely thereof, said frame structure including longitudinally extending lower side members each of which is positione outwardly of said wheels at each side of said frame and disposed at a level below the tops of said wheels, a plurality of upright wall-forming partition means extending transversely of said frame and including upright end members rigid with said lower side members and spaced longitudinally of said frame, a floor structure mounted on said longitudinally extending lower side member and positioned between each pair of said transversely extending upright wall-forming means, lower and upper shelving facing in the direction of said floor structure, said shelving being pivotally mounted in vertically spaced relation on said wall-forming partition means for the support of tobacco receiving racks thereon, said wall-forming partition means constituting tobacco stacking alignment means and endwise support for the stacked tobacco when placed in the racks on said vertically spaced shelving pivotally mounted on said partition means, said upper shelving being collapsible to afford access to the lower shelving and serving also to compressingly retain stacked tobacco on the lower shelving, means providing seats for workmen positioned laterally outward of and adjacent to said lower frame side members, said last mentioned means comprising pivoted depending elongate rigid members at each side of and spaced longitudinally of said frame and movable solely in planes parallel to said upright end members, rigid means carrying a plurality of spaced seats pivotally interconnected with all of said depending rigid members on each side of said frame whereby said seats are monted to swing forwardly and rearwardly of said frame as occasioned by the contour of the terrain over which the harvester moves.

7. The tobacco harvester as defined in claim 6 wherein said transversely extending upright wall-forming means each includes laterally extending adjustable rigid elongate extensions therefor at each side of said frame structure, said spaced elongate rigid members pivotally depending from said laterally extending adjustable elongate extensions whereby said seats are positioned selectively in planes parallel to the side of said frame upright end members.

8. A tobacco harvester as defined in claim 5 including elongate means transversely supported on said frame, said elongate means including means for selectively fixedly spacing said pivotally supported seat means laterally relative thereto.

References Cited by the Examiner

UNITED STATES PATENTS

| | | | |
|---|---|---|---|
| 1,258,694 | 3/18 | Miller | 296—19 |
| 2,216,243 | 10/40 | Kreidler | 296—19 |
| 2,504,403 | 4/50 | Finley | 214—83.1 |
| 2,605,912 | 8/52 | Small et al. | 206—19 X |
| 2,704,158 | 3/55 | Long | 214—5.5 |
| 2,786,585 | 3/57 | Davis | 214—5.5 |
| 2,908,395 | 10/59 | Patterson | 211—45 |
| 3,033,303 | 5/62 | Weekly | 280—32.5 |
| 3,034,664 | 5/62 | Davis | 214—5.5 |
| 3,078,117 | 2/63 | Martini | 206—232 |

HUGO O. SCHULZ, *Primary Examiner.*

MORRIS TEMIN, *Examiner.*